US 7,146,355 B2

(12) United States Patent
Chu-Carroll (10) Patent No.: US 7,146,355 B2
(45) Date of Patent: Dec. 5, 2006

(54) METHOD AND STRUCTURE FOR EFFICIENTLY RETRIEVING ARTIFACTS IN A FINE GRAINED SOFTWARE CONFIGURATION MANAGEMENT REPOSITORY

(75) Inventor: Mark Craig Chu-Carroll, Dobbs Ferry, NY (US)

(73) Assignee: International Business Machines Corporation, Armonk, NY (US)

( * ) Notice: Subject to any disclaimer, the term of this patent is extended or adjusted under 35 U.S.C. 154(b) by 601 days.

(21) Appl. No.: 10/095,487

(22) Filed: Mar. 13, 2002

(65) Prior Publication Data

US 2002/0198873 A1 Dec. 26, 2002

Related U.S. Application Data

(60) Provisional application No. 60/276,238, filed on Mar. 15, 2001.

(51) Int. Cl.
*G06F 17/30* (2006.01)
*G06F 17/00* (2006.01)

(52) U.S. Cl. .......................................... 707/3; 707/102

(58) Field of Classification Search .................... 707/1, 707/2, 3, 4, 5, 6, 10, 100, 101, 102, 104.1; 704/9; 717/101, 102, 120, 121, 122
See application file for complete search history.

(56) References Cited

U.S. PATENT DOCUMENTS 5,778,362 A * 7/1998 Deerwester ..................... 707/5
5,778,368 A * 7/1998 Hogan et al. .................. 707/10
5,950,189 A * 9/1999 Cohen et al. ................... 707/3
6,356,887 B1 * 3/2002 Berenson et al. ............... 707/2
6,681,382 B1 * 1/2004 Kakumani et al. .......... 717/122

OTHER PUBLICATIONS

P. Wu and B.S. Manjunath, Adaptive Nearest Neighbor Search for Relevance Feedback in Large Image Databases, Oct. 5, 2001, ACM, pp. 89-97.*
Sergey Brin and Lawrence Page, The Anatomy of a Large-Scale Hypertextual Web Search Engine, 2000, Stanford University, pp. 1-17.*
Faloutsos, et al., "A Survey of Information Retrieval and Filtering Methods", Electrical Engineering Department, University of Maryland, Technical Report, Aug. 1995, pp. 1-23.

* cited by examiner

*Primary Examiner*—Apu M. Mofiz
(74) *Attorney, Agent, or Firm*—Jesse L. Abzug, Esq.; McGinn IP Law Group, PLLC (57) ABSTRACT

A method and structure of querying software code stored in a database, the software code including a plurality of units of executable program code written in a specific programming language, includes generating a repository of artifacts of the software to be queried, each artifact including one of the units of executable program code, receiving an input query, and determining which artifacts of the repository match the input query.

21 Claims, 7 Drawing Sheets

METHOD AND STRUCTURE FOR EFFICIENTLY RETRIEVING ARTIFACTS IN A FINE GRAINED SOFTWARE CONFIGURATION MANAGEMENT REPOSITORY

CROSS-REFERENCE TO RELATED APPLICATIONS

This Application claims priority based on provisional application, U.S. Ser. No. 60/276,238, having a filing date of Mar. 15, 2001.

BACKGROUND OF THE INVENTION

1. Field of the Invention

The present invention generally relates to a method of setting up and querying a large scale software configuration management (SCM) repository of source code for rapid retrieval of fine-grained program artifacts.

2. Description of the Related Art

Tools have been developed for searching computer program storage repositories containing the source code to a large software system. These tools allow the repository to be accessed by a query which describes a set of relevant properties being sought. The tool then returns the set of program artifacts that possess at least some of the properties contained in the query. Especially for large software programs, such tools are useful for various purposes, including an understanding of the program, debugging, and visual separation of concerns.

However, a conventional method of implementing such a search is extremely slow. Even standard techniques for searching text libraries can result in an intolerably long time to identify the program artifacts that are relevant to a given query. Conventional search tools also operate in an environment of coarse-grained artifacts.

As an example of conventional software query tools, the eColabra/Asset Locator® system, part of IBM's TeamConnect® system, performs an information retrieval based index and search of all program assets located on a network file system. Asset Locator focuses on identifying, summarizing, and searching for complete software components, which is a very coarse-grained artifact relative to the fine-grained artifacts of the present invention, to be explained shortly.

Additionally, conventional search tools require a global analysis/global update. That is, these conventional tools produce a global usage database, which uses information generated by having access to an entire software system simultaneously, rather than allowing summaries to be updated incrementally using only local information.

Most conventional source code repository search tools are geared towards the specific intended purpose of either component reuse or asset management and are unable to target specifically a repository viewpoint and a search within a single project as best appropriate for the various other purposes of searching the repository, such as program understanding, debugging, and separation of concerns. Each purpose potentially requires a unique viewpoint.

SUMMARY OF THE INVENTION

In view of the foregoing problems, drawbacks, and disadvantages of the conventional systems, it is an object of the present invention to provide a method (and structure) in which a software source code repository can be searched by a query.

It is another object of the present invention to provide a query search method in which executable program source code syntax becomes the basis to generate a very large number of fine-grained artifacts for a software source code repository for use in a query search. The syntax is dependent upon the specific programming language of the source code.

It is another object of the present invention to provide a query search method that returns a set of program artifacts exactly possessing the properties of the query.

It is another object of the present invention to provide a query search method that inherently reduces the portion of the repository searched for query matching, thereby providing a significantly smaller candidate set than other known techniques and greatly increasing the speed of the query search.

To achieve the above objectives and goals, in a first aspect of the present invention, described herein is a method and structure of querying software code stored in a database, the software code comprising a plurality of units of executable program code, including generating a repository of artifacts of the software to be queried, each artifact comprising a one of the units of executable program code, receiving an input query, and determining which, if any, of the artifacts of the repository match the input query.

In a second aspect of the present invention, also described herein is a signal-bearing medium tangibly embodying a program of machine-readable instructions executable by a digital processing apparatus to perform the above-described method of querying a software code.

In a third aspect of the present invention, also described herein is a method of querying software comprising a plurality of units of executable program code, including generating keywords for each of the units of executable program code, the keywords comprising terms inherent in the executable program code, each keyword including a programming language context of the keyword in its artifact, generating a repository of artifacts of said software, each artifact comprising one of the units of executable program code, receiving an input query, and determining which, if any, of the keywords match the input query.

In a fourth aspect of the present invention, also described herein is a method of querying software comprising a plurality of units of executable program code, including generating a vector-space repository of artifacts of the software, the vector space having a first plurality of dimensions, receiving an input query, the query having a second plurality of dimensions smaller than the first plurality, searching the repository as confined in size to contain only the second plurality of dimensions, and determining which, if any, of the artifacts match the input query in the reduced repository.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Referring now to the drawings, an exemplary embodiment of the method and structures according to the present invention will now be described. The exemplary embodiment described herein relates specifically to a query of program source code written in Java but it will be obvious to one of ordinary skill in the art that the following techniques apply equally to other computer languages.

The present invention describes one of various features of a new software configuration management (SCM) system developed by the inventor. This system provides versioning of fine-grained program artifacts, and allows these fine-grained artifacts to be dynamically assembled into arbitrary source-file like program views. In order to support this facility, the configuration management system uses a query engine that allows programmers to quickly describe the set of artifacts that should be included in a view.

For such a system to be useful, it is critical that queries be easy to write, and once written, that they execute nearly instantaneously. The present invention is based on a novel information retrieval mechanism that uses incremental pre-analysis in order to allow rapid retrieval of program artifacts that match a given query.

This novel software configuration management (SCM) system enhances collaboration and communication between team members in large scale software development. One of its key innovations is multidimensional program organization, which allows creation of multiple overlapping organizational views of a program based on virtual source files (VSFs), which are dynamically-assembled collections of fine-grained program artifacts. In a VSF based system, a given artifact is potentially a member of many different VSFs, each of which illustrates a different viewpoint.

A central requirement for this new approach to multidimensional organization is the ability to rapidly generate VSFs according to dynamically specified critera. To generate a VSF, the system must search a large program repository containing thousands to hundreds of thousands of fine-grained program artifacts, and identify the set of artifacts that matches a particular descriptive predicate of a query.

An extensible query engine was developed for this new large repository. This query engine is based on the use of a query language which describes queries in terms of simple familiar notions from set theory. In order to allow this language to be used effectively, it was necessary to also develop a new information retrieval (IR) technique for searching source code repositories that yields significant performance benefits compared against standard IR methods applied to program repositories. This new technique will shortly be explained as based on the keyword-vector IR method described in a 1971 article by G. Salton, "The SMART Retrieval System—Experiments in Automatic Document Processing". As explained shortly, in the present invention the index precomputation process has been modified from the older technique to record semantic information about code contained in a stored artifact.

One of the central notions behind the new configuration management system is that programmers will be able to take advantage of multiple different organizational views of the program. In a conventional SCM system, there is an overlap of functionality between storage and organization. That is, the composite organizational units of the program (source files) are also the atomic storage units used by the SCM. This overlap of functionality means that each program has one dominant organizational structure through which programmers are forced to view the system. This is particularly onerous in languages like Java which dictate that the dominant semantic structure of the system (the class) must also be strongly correlated with the dominant organizational structure of the system (the source file).

Orthogonal Program Organizations

Figure 1A:
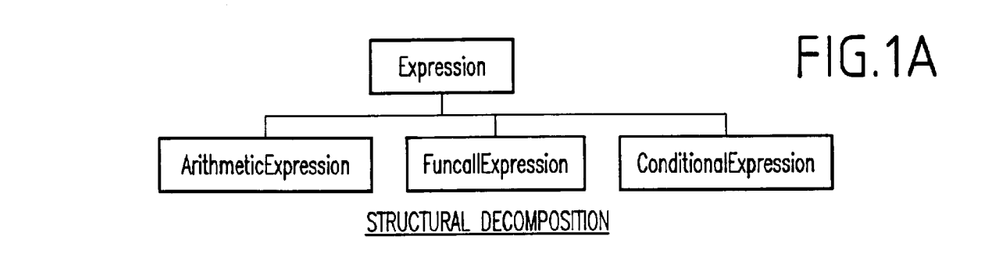
FIG. 1A shows a structural perspective of a software program, using inheritance to group together related language constructs.

However, as argued by the separation of concerns community, working through a single dominant view or decomposition of the program has significant problems. Specifically, while the dominant decomposition may be useful for many tasks, there are also many tasks for which it is poorly suited. The canonical example is a programming language compiler implemented through the interpreter pattern. In this implementation, each language construct is implemented by a class, using inheritance to group together related language constructs. This implementation scheme is termed the structural perspective on a compiler and is illustrated in FIG. 1A.

Another common way of understanding a compiler is in terms of the data-flow relationships between the operational parts of the compiler. The parser reads the program source, generating an Abstract Syntax Tree (AST). A type analyzer reads the AST, checks it for validity, and generates a new AST with type decorations. The code generator reads the type-decorated AST, and produces a target code stream. This viewpoint is termed the data-flow perspective on a compiler and is illustrated in FIG. 1B.

Figures 1B, 1C:
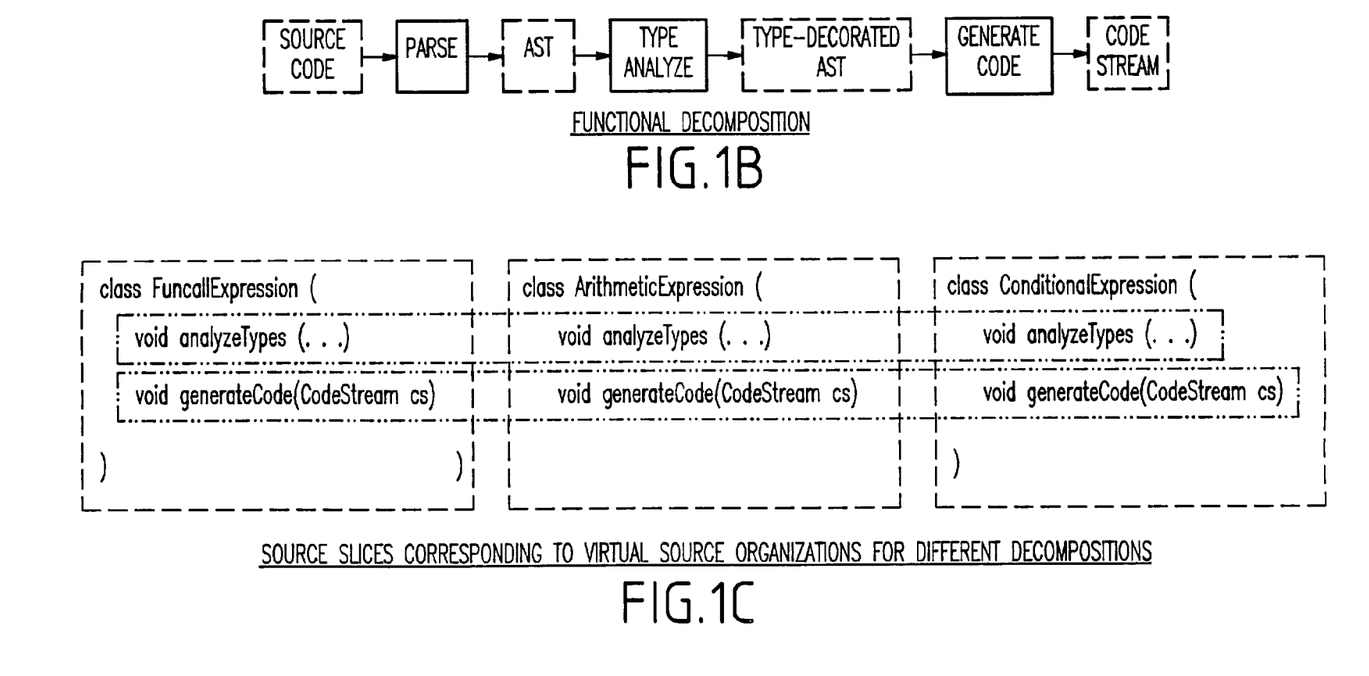
FIG. 1B shows a functional perspective of a software program, using data flow relationships to group related language constructs.
FIG. 1C shows a structural perspective of a Java-based implementation.

A Java-based implementation according to the structural perspective would include a set of classes, as shown in FIG. 1C. All of the code for a particular syntactic structure would be co-located in a single class and, thus, a single file. In this organization, the code for an element in the data-flow perspective is scattered among many different files. This scattering makes it difficult for a programmer to follow the flow of control through any data-flow component. For example, it would be difficult to locate a control flow bug in the code generator. On the other hand, adding a new expression type to the language would be quite easy using this perspective, because it would requiring adding one new component to the system, without perturbing the other components.

FIG. 1C illustrates two useful organizational views for this example. The vertical boxes correspond to the semantic organization of a set of Java classes, where each class is implemented by a single file. Without changing the code, the existing elements can be reorganized into a data-flow view by creating source files based on the horizontal slices, grouping the code for all of the functional elements together into source files. These two orthogonal organizations of the program allow programmers to view code from different perspectives without transforming the semantic structure of the system.

Examples like this two-dimensional example in FIG. 1C are extremely useful for demonstrating the idea and purpose of multidimensionality and they are commonly used. However, it has been the experience of the inventor that the multidimensional structure useful for large "real world" systems is not so simple. The real views that programmers are interested in are much more complicated than the regular orthogonal structures that occur in the common illustrative example. For instance, shown in FIG. 2 is a small subsection of a system 20 implemented by the inventor.

Figure 2:
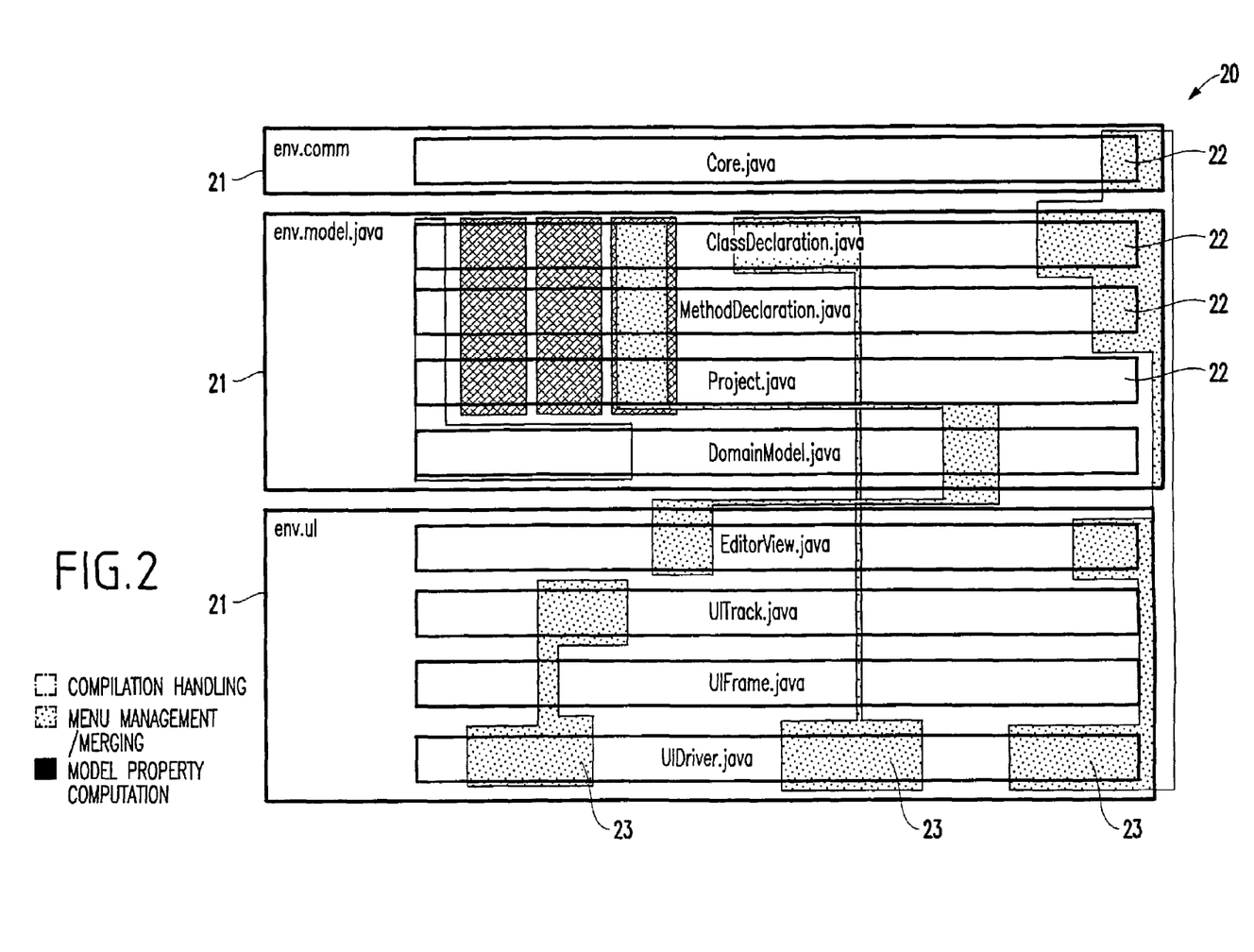
FIG. 2 shows possible desirable orthogonal program views in an exemplary actual Java-based system.

Various modules 21 are exemplarily shown in FIG. 2. The source files in the dominant organization of this code are shown with the horizontal boxes 22. Based on the experience of the group developing the system, a set of slices was developed that corresponded to different views of the system that would have been useful while implementing and debugging the system. These alternative organizational views of the program are shown by the irregular boxes 23 that cross the dominant horizontal organization of the program.

In real systems containing multiple dimensions of concerns, this kind of irregularity is much more common than the simple orthogonal structures of the example in FIG. 1C. In order for programmers to be able to properly express these complex and irregular alternative organizations, the system must provide programmers with an expressive method for dynamically specifying the elements that should be included in an organizational view of the system.

Further, view generation is not a static process. In real systems, programmers will frequently be creating new views as they discover new dimensions of concern, or as they encounter new tasks that are best served by different perspectives. Therefore the system that allows the generation of new views must be dynamic, expressive, and fast.

Finally, organizational views contain significant semantic meaning, which can help programmers communicate information about different viewpoints on the system. Therefore, it is required that the system must be capable of naming and storing queries and query results as artifacts in their own right.

These concerns are best met by integrating a query language into the repository, which allows the repository to be rapidly searched for program elements that should be included in a program view. The query language is tightly integrated with the other SCM features of the system, in order to allow queries and results to be named, stored, versioned, locked, and searched like all other artifacts in the program repository.

In development of the present invention, a language has been developed which is loosely based on the idea of set comprehensions in a typed set theory. A query expression describes a set of program artifacts which should be included. Query expressions can include nested quantifiers and sub-queries.

Syntax Summary for Queries

An exemplary syntax of this new query language is demonstrated below in Backus-Naur Form (BNF). The set of types and predicates is dependent on the programming language being analyzed.

Query ::= UniversallyQuantifiedExpression
UniversallyQuantifiedExpression ::= "all" var -continued

[":" Type] "|" PredicateExpression
ExistentiallyQuantifiedExpression ::= "exists" var
[":"] Type "|" PredicateExpression
PredicateExpression ::= PredicateExpression "and" PredicateExpression
  | PredicateExpression "or" PredicateExpression
  | "(" PredicateExpression ")"
  | UniversallyQuantifiedExpression
  | ExistentiallyQuantifiedExpression
  | predicateName "(" var ( "," var*) ")"
  | var binaryPredicateName var A current set of types and predicates is carefully chosen to maximize expressibility while being amenable to an extremely efficient search system, described in the following section. Requests from programmers have been informally collected for the types of queries that they believe would be useful. This simple set of types and predicates successfully meet most of these requests.

The structure of the language makes it extremely easy to add clauses to the query that correspond to the kinds of incremental updates that occur in typical systems. For example, given a query all x|pred, when a user manually adds an artifact $a_j$ to the resulting VSF, the query is trivially updated to: all x|(pred) OR x=$a_j$.

The extension mechanisms for the query language make it possible to add both types and predicates to the language, and to provide custom implementations of the quantifiers for user defined types.

Efficiently Implementing Queries

The new software configuration system uses a program repository containing an extremely large number of artifacts compared to conventional SCM query techniques. That is, the present invention has a much smaller granular size than earlier systems in which an artifact was a file. Due to the fact that a finer artifact granularity is used than in file-based SCM systems, typically between one and two orders of magnitude more artifacts are stored in the present invention than in such a file-based system of conventional systems.

However, the system of the present invention is also designed so that programmers view code through dynamically executed queries. It is, therefore, crucial that evaluating a query over a programmers workspace be virtually instantaneous, even over an extremely large number of artifacts such as in the present invention.

The Conventional Keyword Search Approach

The approach of the present invention to this problem is based on applying information retrieval (IR) techniques in the query engine. The technique is loosely based on the keyword summary vector method of classic IR systems introduced by Gerald Salton in the SMART system described in the above mentioned article.

A typical formulation of information retrieval includes the following problem: Given a large library of textual documents L and a natural language question q, extract the set of documents from L that contain an answer to q. The most common approach to this problem is to perform pre-analysis on the document library, and then to use the results of the pre-analysis to generate an index which allows efficient retrieval of potentially relevant documents.

The keyword vector solution is an early IR technique which is based on selecting a set of keywords, which are the words that are likely to identify the subject matter of a document. An index is then generated by searching each document in the library, and recording how often each of the key words are contained in each document. This information is recorded in a vector by assigning each keyword a vector index. Thus, each document is represented by a sparse multidimensional vector defined by its contents.

When a question is submitted, it is likewise analyzed for the keywords contained in the question, and a query vector is generated. The system then searches the library by computing the cosine of the query vector against each of the document vectors. This value is known as the cosine score for a document. Any document whose cosine score is with a given distance from 1 is considered as a potential match. This mechanism typically searches an large initial document set, creating an extremely small candidate set which can then by considered in detail to extract the answer to the query.

The Usage Summary Search Approach

Figure 3A:
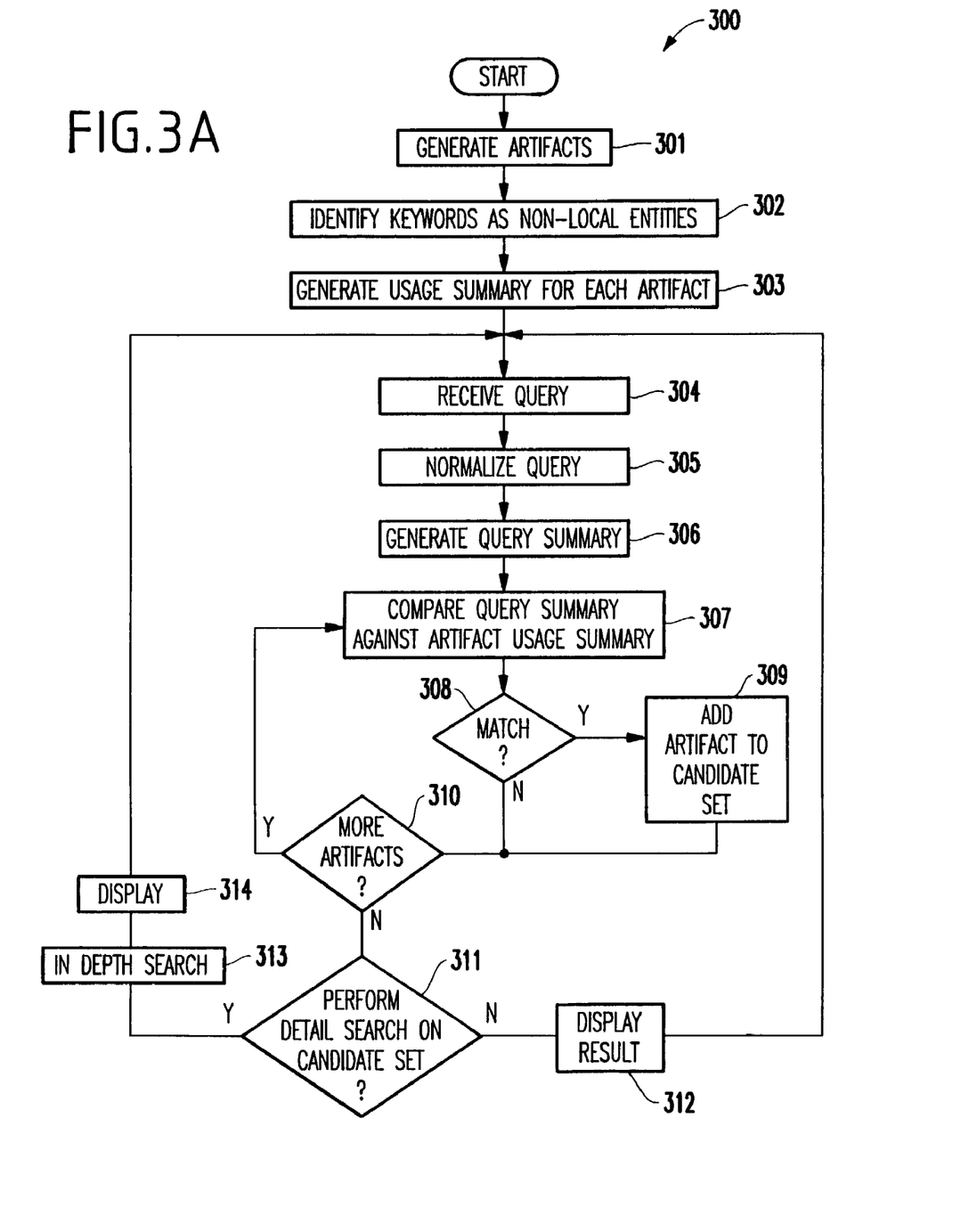
FIG. 3A is a flowchart of an exemplary embodiment of the present invention.
Figure 3B:
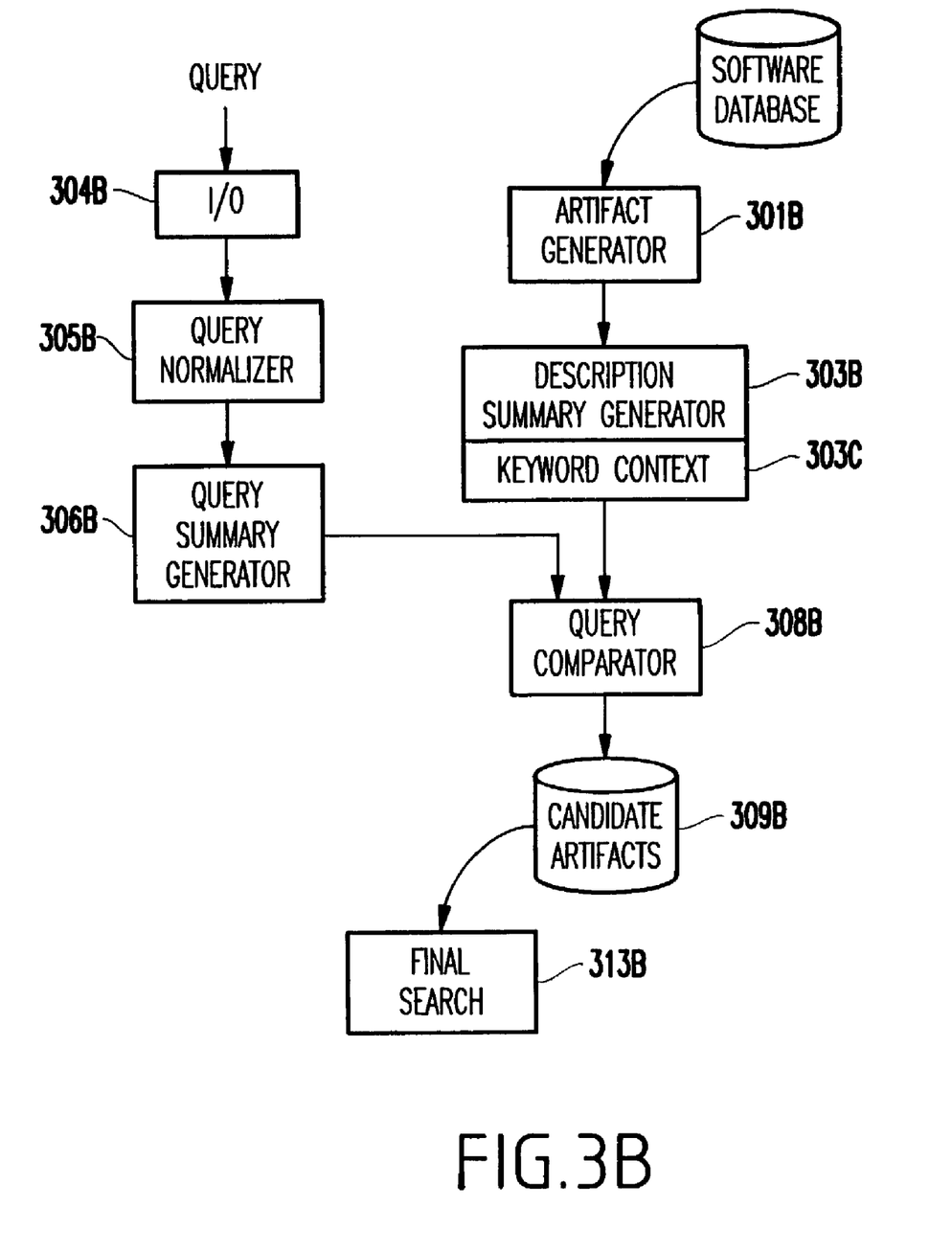
FIG. 3B is a block diagram of system modules to execute the flowchart of this exemplary embodiment.

FIG. 3A contains a flowchart of an exemplary embodiment 300 of the present invention and will be referred to throughout the following discussion. FIG. 3B is a corresponding block diagram of software modules that execute the flowchart of FIG. 3A.

The approach of the present invention is based on the above-described SMART technique, but modified to take advantage of the semantics of the program code contained in the artifacts. In classic IR, the search texts are natural language documents, for which precise semantic information is difficult or impossible to generate. However, when the search texts are program source in a particular programming language, then it is simple to extract and take advantage of contextual semantic information. This information can be taken advantage of in three ways.

First, a precise matching is possible. That is, given a query, cosine scoring need not be used. When dealing with program code, both the query and the summaries can be expressed precisely, eliminating the need to deal with the imprecision of techniques such a cosine scoring. A query matches only if the fragment perfectly matches the query.

Secondly, in a classic IR system, it is difficult to determine the set of relevant keywords that should be indexed. In a program artifact of the present invention, the set of relevant "keywords" is the set of non-local entities that can be affected by the fragment. Here, "non-local entities" refers to all identifiers having a program language scope outside a local scope region of a program fragment. This set of identifiers is easily recognized in program source code and can be easily achieved by a computer program rather than relying on a human to select keywords, as shown in step 302 in FIG. 3. Therefore, given a program artifact, it is easy to identify the local and non-local identifiers in that artifact and infer the set of interesting keywords, i.e., the set of non-local identifers, without human intervention.

Finally, in classic IR systems, document summaries only provide information about whether and how often a given keyword occurs in the document. For natural language texts, it is difficult to infer precise information about the form of usage of the keyword within the document. However, for program source code, it is possible to enumerate the complete set of usage categories for an identifier, and for a given occurrence of the identifier. Therefore, it is possible to precisely identify how it is being used in an artifact, its context within the artifact.

Taking advantage of these properties of source-code based program artifacts, in the present invention the conventional keyword vector is replaced with a usage summary. The usage summary includes a list of non-local identifiers contained in the artifact, with each identifier tagged by information describing the contexts in which it is used. By providing this extra information in the summary, it is possible to perform queries significantly faster than in a conventional IR approach. Step 303 of FIG. 3 shows the generation of the usage summaries for each artifact in the repository as explained in more detail below.

This results in a candidate set of artifacts that are potential entries in the resulting VSF. Depending on the query, for example, in the case of queries with nested existentials, the system may need to do further analysis in order to determine if the elements of the candidate set are properly included in the query result.

As an example of how artifacts and keywords in the present invention differ from the conventional keyword query search described above, below is a simple code artifact followed by its usage summary. The meaning of the symbols in the usage summary will be explained shortly.

```
SampleArtifact:
public void foo() {
    x.bar(y);
    int k = z;
    bar(12, k);
    bim(x);
    x = bim(k);
}
```

Usage Summary for this sample artifact becomes:

"bar/>, bim/>, foo/+, x/:^, y/^, z/-"

The inventive technique can now be described in two parts. First, a description of the process by which the inventive summaries are generated and, second, a description of how the summaries are used to efficiently execute queries.

Step One: Generating Usage Summaries

A usage summary includes a short string containing a list of non-local identifiers contained in a program artifact, and a series of tags identifying the usage contexts of that identifier. Program artifacts to are analyzed to identify the following usage contexts:

Declaration: The artifact contains a declaration of the identifier. This is denoted in a summary by the "+" character.

Assignment: The artifact contains an assignment to the identifier. This is denoted in the summary by a ":".

Use: The artifact contains a use of the value of identifier. This is denoted in the summary by a "−".

Pass: The artifact contains a use of the value of the identifier as a parameter to a call. Note that this is distinguished from simple use because it allows the identification of artifacts where the value of a variable can escape. This is denoted in the summary by a "^".

Call: The artifact contains a call to a method named by the identifier. This is denoted in a summary by a ">".

Target: The artifact contains a call to a method where the name is the target of the invocation. This is denoted in the summary by a "i".

Inherit: The artifact contains an inheritance clause naming the identifier. This includes both "extends" and "implements" inheritance in Java. This is denoted in a summary by a "@".

Make: The identifier is used in an allocation expression. This is denoted in a summary by a "!".

As seen from the sample artifact above, the usage summary includes a comma-separated listing of identifiers in lexicographic order, each of which is followed by a listing of the usage classifications described above. The usage classifications are listed in the order specified in the list above, allowing the usage classes of an identifier to be represented by a fixed length bit vector.

The usage summary is generated by traversing the AST from the leaves upward. As each expression is parsed, it generates a list of variables that are active in the expression. This is called the variables in play (VIP) list. When, in the upward traversal of the AST, a node is reached that fixes the usage type of the variables is reached, the variables are tagged in the appropriate manner. For instance, in the expression 'foo(x,y,z)', the system would first process the AST nodes for "x", "y", and "z", and add the variables to the VIP list. Then the system reaches a procedure call node for "foo", at which point the usage type of the VIP list can be identified as "passed".

For example, the expression "x+foo(bar(y), z, a+(b*c))" is parsed according to the present invention:

1. First the subexpression "bar(y)" is processed. The parameter is a simple identifier expression. If "y" is non-local, it is tagged as passed. The name of the function being invoked is then tagged.

2. Next, the subexpression "z" is evaluated. Since it is a parameter to the call, it is tagged as passed.

3. Next, the subexpression "a+(b*c)" is evaluated. The variables "a", "b", and "c" are all used. They are not tagged as passed since the entity that is passed is a new value generated by the arithmetic expression.

4. Next, the "foo" subexpression is evaluated and tagged as being invoked.

5. Finally, "x+foo( . . . )" is evaluated. "x" is tagged as used, and "foo" is tagged as invoked.

The above example demonstrates that exemplarily an artifact in the present invention for the Java language could be a subroutine. It should be apparant that using this level of code section as the artifact unit provides far finer granularity than a system in which entire files are artifacts, each having its associated keyword vector. It should also be apparent that the number of artifacts in a software repository of the present invention will be correspondingly larger than in conventional systems. Finally, it should also be apparent that subroutine level of program architecture as shown in the above example is only one possibility. The present invention more generally recognizes that the artifact unit can be chosen somewhat arbitrarily as based on the syntax of the specific programming language used for the source code in the repository.

For a given artifact a, this method examines each token at most once, and so the complexity of this process is O(size (a)), where size(a) is the number of tokens in the artifact. In practice, the time to generate the summary is trivial compared against the time to parse the artifact. The result of the summary is stored as a string containing a list of names paired with bit-vectors with one bit for each of the above usage descriptors.

Step Two: Retrieving Artifacts Using Summaries

Currently, the new software configuration system including the present invention performs queries against workspaces, which are collections of code checked out of the repository so that for each program artifact managed by the repository, at most one version is included in the workspace. The workspace is contained in a relational database, structured very similarly to a Unix-like directory hierarchy file system. Artifacts are stored in a data table associating an identifier with the artifact data. In addition, there is a directory table which represents a full directory hierarchy associating pathnames with artifact identifiers. The usage summary is associated with the artifact data, not in the directory entries.

A query is performed against an initial candidate set generated from a given directory or directory hierarchy, which includes the set of artifacts referenced by entries in that directory or hierarchy. The usage summaries are generally small, for example, the average summary length in the exemplary test cases is under 100 bytes, and so the full set of summaries for a workspace can be cached. A query is received in step 304 of FIG. 3.

The first step in evaluating the query is normalization (step 305 of FIG. 3). That is, exemplarily, all queries are required to be in disjunctive normal form. This normalization is done using standard algorithms well known in the art. Once the query is in BNF, a summary string is generated for each conjunctive sub-clause of the BNF query. The generation of this query summary string is trivial in that each of the usage classes in the summary has an associated predicate in the query language, and a reference to a predicate generates an entry in the summary string.

For example, given the query "all x|x defines foo AND x assigns bar", the system would translate the "defines foo" clause to be "foo/+" and the "assigns bar" clause to be "bar/:", thereby generating a query summary of "foo/+,bar/:".

Thus, for each query a set of query summaries is obtained, one for each conjunctive clause in the BNF. In step 306 of FIG. 3, these are compared against the summary strings for the artifacts in the workspace, using the exemplary algorithm illustrated below.

Exemplary Algorithm:

```
proc compareQuery(query : array of idUsage, candidate : array of
idUsage): boolean =
    let qdx = 0 and sdx = 0
    while (qdx < query.length and sdx < candidate.length) do:
        while (identifier(query[qdx]) < identifier(candidate[sdx]) and
            sdx < candidate.length do):
                increment sdx
        end while
        if identifier(query[qdx]) > identifier(candidate[sdx])
        then return FALSE
        let qtags = usageTags(query[qdx]) and stags =
            usageTags(candidate[sdx])
        if (qtags bitwiseAnd stags == qtags) then qdx++; sdx++
        else return FALSE
    end while
    if (qdx == query.length) then [comment: all tags in query
    have been matched]
        return TRUE
    else return FALSE
```

The result of this process is a reduced candidate set of artifacts, which may answer the query. For more complex queries, the system must retrieve the set of candidate artifacts, and perform detailed analysis on the candidate set to extract the precise query result.

DETAILED DESCRIPTION OF THE ALGORITHM

The algorithm for checking a given candidate artifact summary against a query is essentially a simple simultaneous array traversal of the query and candidate summaries, dominated by the traversal of the query summary. The query summary is compared against a candidate fragment summary, each of which have been converted into a list of identifier summaries. Since the summary strings contain identifiers in sorted order, the identifier summary lists are likewise in sorted order.

There is a pointer to a current identifier summary in each of the two lists. Each time the query index is incremented, the candidate fragment summary index is incremented until it either reaches the index of the identifier in the query summary, or it reaches an identifier lexicographically greater than identifier in the query summary.

If, after advancing the candidate index, the indices into the two summaries reference the same identifier, then the usage tags are compared using a bitwise comparison. If all use cases from the query are present in the candidate, then the two summaries match on this identifier, and the query summary index is incremented. Otherwise, the candidate index references an identifier lexicographically greater than that referenced by the summary index, and the candidate cannot match the query, because an identifier required by the query is not present in the candidate. If all query summary entries are matched, then the candidate matches the query.

Complexity

This algorithm includes the following three key pieces: breaking the query and summary into component parts; performing the walk over the query and summary parts; and performing the actual comparisons.

Breaking the query and summary into parts is trivially performed in time linear to the length of the summary string using a standard regular expression algorithm. The traversal method used always increments one of the traversal pointers, and ends when one pointer traverses off the end of its usage tag array. It therefore performs at most (q+s) tag comparisons, were q is the number of tag elements in the query, and s is the number of tag elements in the artifact summary. Finally, comparing tags includes a single bitwise comparison, which takes unit time. Therefore overall, the complexity of this task for a single conjunctive query is linear in the sum of the lengths of the query and summary strings.

Given a query in BNF form, the worst case performance is equivalent to executing each of the conjunctive subqueries as a separate query. This the complexity of performing a query in BNF form is $\mathcal{O}(d*(q+s))$, where d is the number of conjunctive subclasses of the BNF query, q is the length of the query string, and s is the length of the artifact summary string. While the length of the BNF form of the query is potentially exponential compared to the initial query, in practice, typical queries do not grow to unreasonable sizes.

Performance Results

In order to test an exemplary system of the present invention, two codebases were incorporated into the system: the "ant" compilation package from the Jakarta system, and a freeware Java text editor called JEdit. For each system, a sample set of six queries is created that would be of interest to a programmer working on that system.

Performance Measurements of Queries Over the JEdit Codebase

The queries were executed using three different strategies:

1. Baseline Strategy

This technique knows the name of each artifact used in the repository, and uses its understanding of name encodings to reduce the candidate set. For each artifact in the candidate set, it then retrieves and analyzes the artifact to determine if the artifact matches the query. This algorithm is extremely inefficient, but it is included in order to illustrate the impact of applying IR to this problem. It should be noted that the time scale is logarithmic, and that the time difference for the summary strategy discussed below would be essentially invisible on a normal time scale.

2. Keyword Strategy

This technique is the common vector-based strategy of information retrieval, using an artifact's non-local identifiers as the indexed keyword set. It maintains a keyword index of all of the non-local identifiers referenced within a fragment. It then uses this keyword information to reduce the size of the candidate set. For each item that was not disqualified using either name-encoding information or the keyword index, it analyzes the artifact to determine if it matches the query.

3. Summary Strategy

This is the technique described in the section above on generating usage summaries. It maintains a non-local variable usage summary for each artifact. At query execution time, it uses only summary information to reduce the candidate set. After this, if necessary, it would perform analysis to determine if the artifact matches the query. For the currently implemented set of queries, this algorithm never needs to perform detailed analysis. The summary system maintains a cache of chunk summaries which is reused for multiple queries. The total time to retrieve this information averaged 2 seconds for the exemplary test systems done by the inventors.

In order to run the test, versions of the new software configuration system repository were generated, first, containing no summary, then containing keyword summaries of non-local variables and, finally, containing complete usage summaries. Detailed information about the time to generate these summaries are not presented because the I/O time to store the code in the repository dwarfs the time taken to compute the summaries.

In these tests, there was no measurable difference in time to generate a repository between the three versions. For example, importing the Jakarta-Ant codebase into the repository took approximately six minutes, plus or minus 30 seconds. This estimate is based on experiments that the total time difference over a repository of five thousand fragments is approximately fifteen seconds—less than half of the observed variation caused by external factors.

Figure 4:
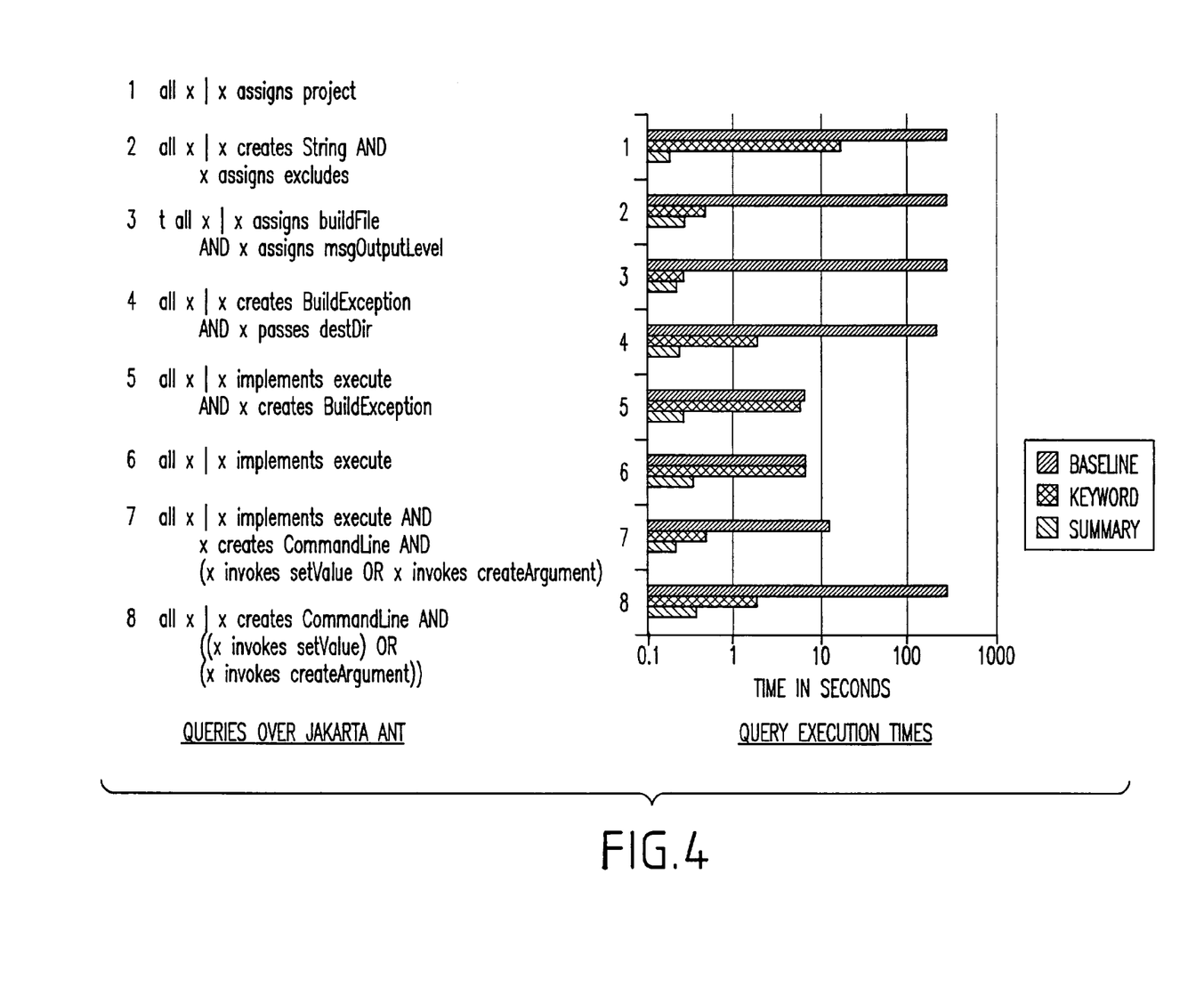
FIG. 4 shows performance measurements of queries over the jakarta-ant codebase.
Figure 5:
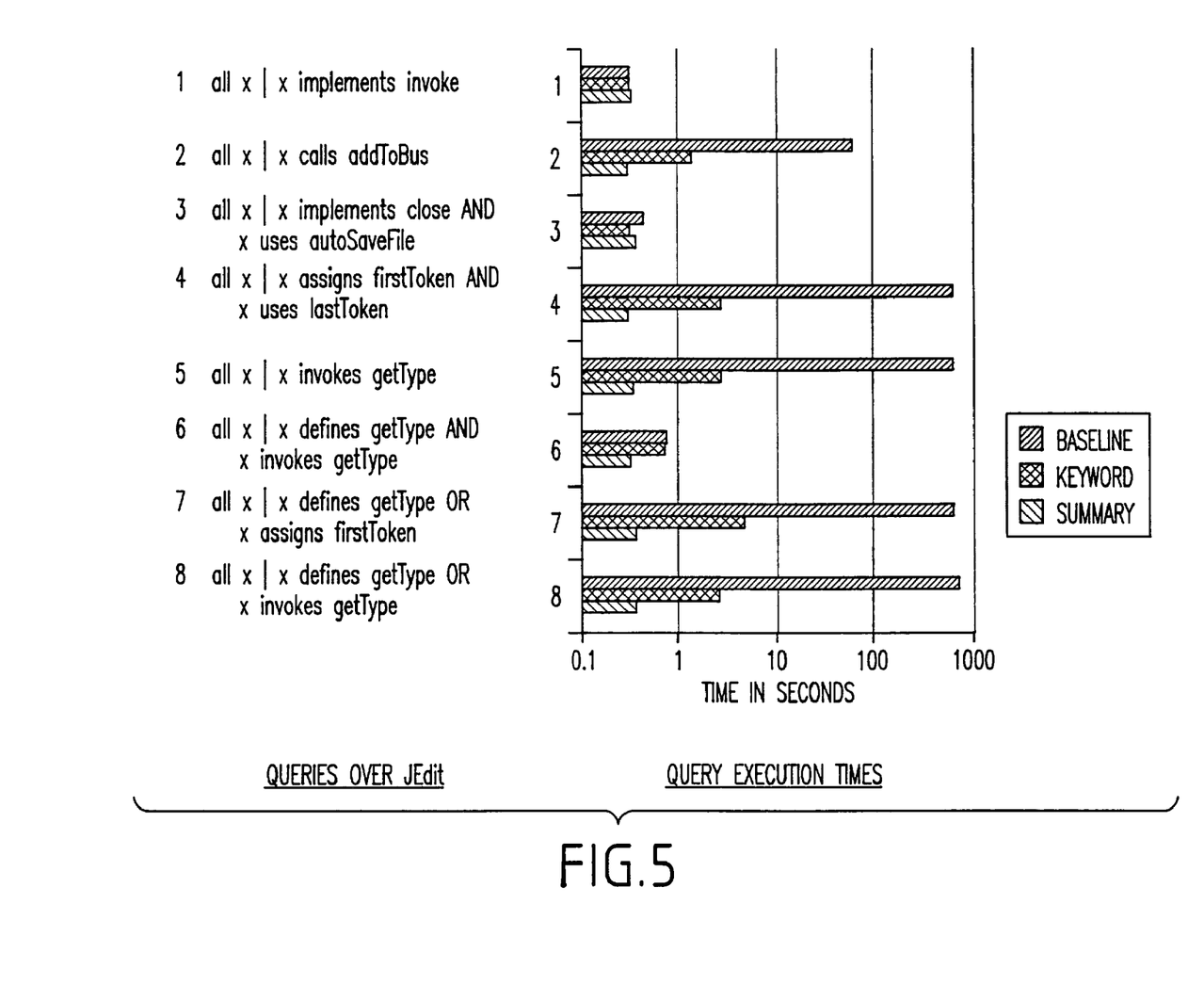
FIG. 5 shows performance measurements of queries over the JEdit codebase.

The queries used, and results of this performance test for the software configuration system on the Jakarta-ant codebase are presented in FIG. 4. The queries and results of the test for JEdit are presented in FIG. 5. The Jakarta-Ant codebase included a total of 40387 lines of code in 3062 fragments, and the JEdit codebase included 73097 lines of code in 5531 fragments.

Finally, information retrieval techniques have been applied for fine-grained code reuse by systems like CodeFinder and CodeBroker. These systems use IR techniques such as latent semantic indexing to create an interactive program reuse environment. CodeBroker watches programmer keystrokes, and constantly checks the index in order to suggest reuse candidates when a programmer starts to write something that resembles a program artifact known by the broker. Like the new software configuration system, CodeBroker is based solely on information extracted from the program. But CodeBroker generates its queries dynamically and automatically, refining them as the programmer continues to type a fragment of source code. With this automatically generated query, CodeBroker selects program artifacts in the repository using the cosine distance metric that we described above. All program artifacts within a particular distance are presented to the user as potential reuse candidates.

The idea of multidimensional separation of concerns has been explored in the software engineering community. Most of the work in this field has been focused on tools that allow programmers to write systems using explicitly multidimensional semantic structures. These systems generally take two forms: tools that allow different perspectives and viewpoints (corresponding to different dimensions of concerns) to be reconciled or systems which allow programs implemented with concerns separated using linguistic structure concepts to be integrated using program composition. Rather than providing another composition or reconciliation mechanism, the effort of the present invention has focused on the organizational aspect, keeping code in a single dimensional semantic structure, which allows multidimensional organizational views. The inventors believe that this approach is complementary with the other approaches, and that multidimensionality is best supported through a combination of these techniques.

Exemplary Hardware Implementation

Figures 6, 7:
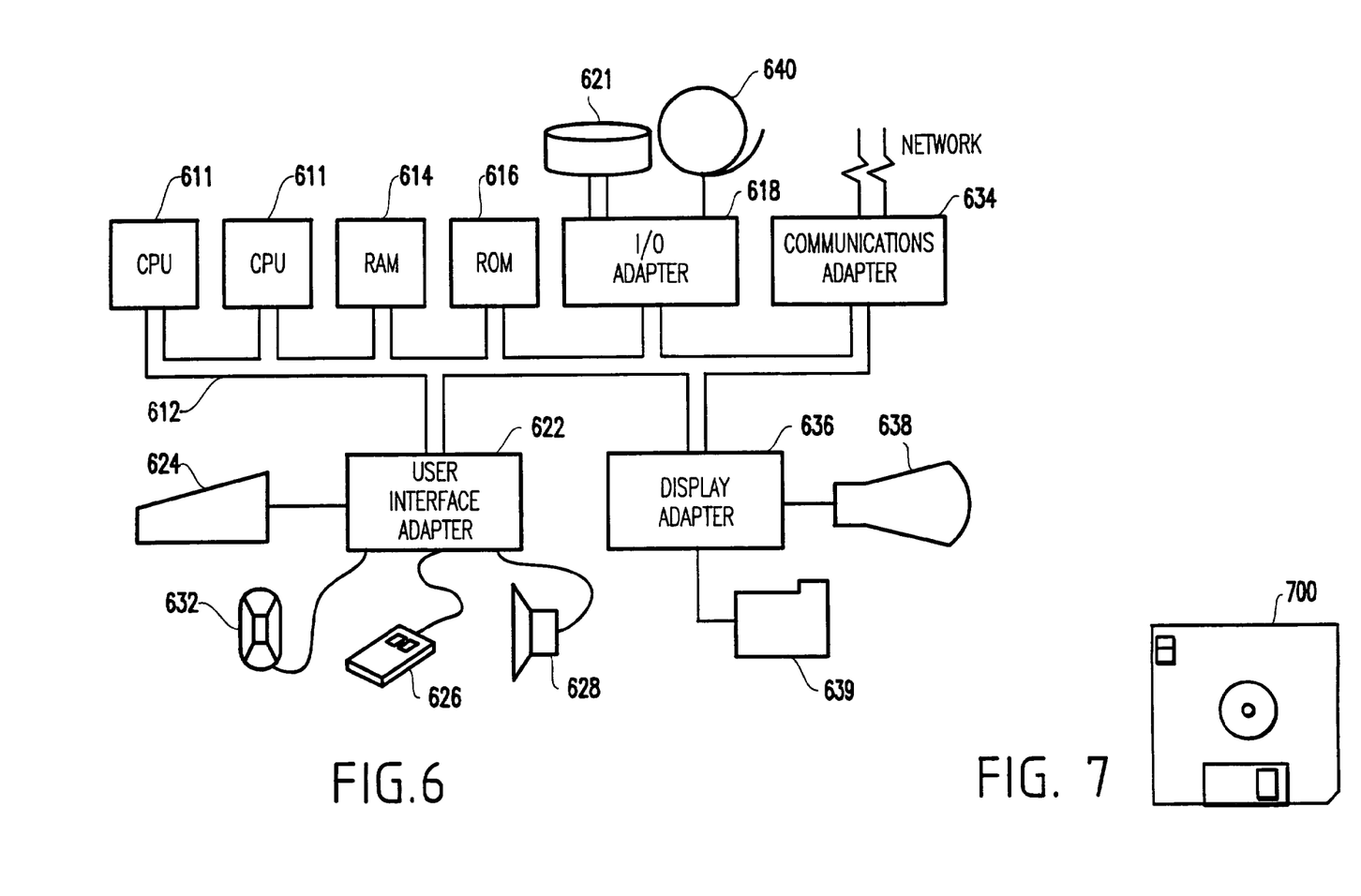
FIG. 6 illustrates an exemplary hardware/information handling system 600 for incorporating the present invention therein.
FIG. 7 illustrates a signal bearing medium 700 (e.g., storage medium) for storing steps of a program of a method according to the present invention.

FIG. 6 illustrates a typical hardware configuration of an information handling/computer system in accordance with the invention and which preferably has at least one processor or central processing unit (CPU) 611.

The CPUs 611 are interconnected via a system bus 612 to a random access memory (RAM) 614, read-only memory (ROM) 616, input/output (I/O) adapter 618 (for connecting peripheral devices such as disk units 621 and tape drives 640 to the bus 612), user interface adapter 622 (for connecting a keyboard 624, mouse 626, speaker 628, microphone 632, and/or other user interface device to the bus 612), a communication adapter 634 for connecting an information handling system to a data processing network, the Internet, an Intranet, a personal area network (PAN), etc., and a display adapter 636 for connecting the bus 612 to a display device 638 and/or printer 639 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 611 and hardware above, to perform the method of the invention.

This signal-bearing media may include, for example, a RAM contained within the CPU 611, as represented by the fast-access storage for example. Alternatively, the instructions may be contained in another signal-bearing media, such as a magnetic data storage diskette 700 (FIG. 7), directly or indirectly accessible by the CPU 611.

Whether contained in the diskette 700, the computer/CPU 611, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A method of querying software code stored in a database, said software code comprising a plurality of units of executable program code in a hierarchical structure having at least one hierarchical level, said method comprising:

generating, from said software code stored in said database, a repository of artifacts of said software to be queried, each said artifact comprising one of said units of executable program code, said artifact generating being based on a predetermined level in said hierarchical structure, said generating comprising an extracting from said software code in said database of said executable program code units at the predetermined hierarchical level;

receiving an input query; and determining which, if any, of said artifacts of said repository match said input query.

2. The method of claim 1, further comprising:

generating for each said artifact in said repository a description summary, said description summary comprising a set of keywords contained in said artifact.

3. The method of claim 2, wherein said set of keywords comprises non-local entities in said artifact.

4. The method of claim 2, further comprising:

generating for each keyword a description of a context of said keyword as used in its corresponding artifact.

5. The method of claim 2, further comprising:

generating a query summary for said query;

comparing said query summary with each said artifact description summary; and generating a set of candidate artifacts based on said comparing.

6. The method of claim 5, further comprising:

performing a further search on said set of candidate artifacts to further limit a search result.

7. The method of claim 1, further comprising:

normalizing said input query.

8. The method of claim 1, wherein said unit of executable code used as a basis of said artifacts comprises a section of said program code for a subroutine.

9. A system for querying software code stored in a database, said software code comprising a plurality of units of executable program code in a hierarchical structure having at least one hierarchical level, said system comprising:

a repository generator for generating, from said software code stored in said database, artifacts of said software to be queried, each said artifact comprising one of said units of executable program code, said artifact generating being based on a predetermined level in said hierarchical structure, said generating comprising an extracting from said software code in said database of said executable program code units at the predetermined hierarchical level;

an input device receiving an input query; and a comparator determining which, if any, artifacts of said repository match said input query.

10. The system of claim 9, further comprising:
a description summary generator for generating for each said artifact in said repository a description summary, said description summary comprising a set of keywords contained in said artifact.

11. The system of claim 10, wherein said set of keywords comprises non-local entities in said artifact.

12. The system of claim 10, further comprising:
a context generator for generating for each keyword a description of a context of said keyword as used in its corresponding artifact.

13. The system of claim 10, further comprising:
a query summary generator for generating a query summary for said query;
a comparator for comparing said query summary with each said artifact description summary; and
a memory device to store a set of candidate artifacts based on said comparing.

14. The system of claim 13, further comprising:
a comparator to perform a further search on said set of candidate artifacts to further limit a search result.

15. The system of claim 9, further comprising:
a normalizer to normalize said input query.

16. The system of claim 9, wherein said unit of executable code used as a basis of said artifacts comprises a section of said program code for a subroutine.

17. A signal-bearing medium tangibly embodying a program of machine-readable instructions executable by a digital processing apparatus to perform a method of method of querying software code stored in a database, said software code comprising a plurality of units of executable program code in a hierarchical structure having at least one hierarchical level, said method comprising:
receiving an input query for querying a repository of artifacts having been generated from said software code, each artifact respectively comprising one of said units of executable program code, said artifacts having been generated by extracting from said software code in said database said executable program code units at a predetermined hierarchical level in said hierarchical structure; and
determining which, if any, of said artifacts of said repository match said input query.

18. A method of querying software comprising a plurality of units of executable program code in hierarchical structure having at least one hierarchical level, said method comprising:
generating keywords for each said unit of executable program code extracted from said software at a predetermined level in said hierarchical structure, said keywords comprising terms inherent in said executable program code, each said keyword including a programming language context of said keyword in said artifact;
generating a repository of artifacts of said software, each said artifact comprising one of said units of executable program code;

receiving an input query; and
determining which, if any, of said keywords match said input query.

19. A method of querying software comprising a plurality of units of executable program code in a hierarchical structure having at least one hierarchical level, said method comprising:
receiving an input query, said query having a second plurality of artifacts, each said artifact having been generated as respectively comprising one of said units of executable program code at a predetermined level in said hierarchical structure, said vector space having a first plurality of dimensions, said input query having a second plurality of dimensions smaller than said first plurality;
searching said repository as confined in size to contain only said second plurality of dimensions; and
determining which, if any, of said artifacts match said input query in said vector-space repository, as determined from searching only said second plurality of dimensions.

20. A signal-bearing medium tangibly embodying a program of machine-readable instructions executable by a digital processing apparatus to perform a method of querying software code stored in a database, said software code comprising a plurality of units of executable program code in a hierarchical structure having at least one hierarchical level, said method comprising:
means for receiving an input query; and
means for determining which, if any, of artifacts of an artifact repository match said input query, said artifact repository having been generated from said software code in said database as a plurality of artifacts, each said artifact respectively comprising one of said units of executable program code extracted from said software code as executable units of said software code at a predetermined level in said hierarchical structure.

21. A method of querying software code stored in a database, said method comprising:
identifying units comprising said software code, wherein said units comprise routines and sub-routines included in said software code;
generating a repository of artifacts for said software code, each said artifact corresponding to one of said routines or sub-routines;
generating a usage summary for each said artifact, said usage summary comprising a listing of non-local identifiers in said artifact,
receiving an input query; and
determining which, if any, of said artifacts match said input query, said determining initially checking said input query against said usage summaries.

* * * * *